United States Patent [19]

Stahler

[11] 4,337,885
[45] Jul. 6, 1982

[54] APPARATUS FOR GUIDING TAPE
[76] Inventor: Alfred F. Stahler, 5521 Big Oak Dr., San Jose, Calif. 95129
[21] Appl. No.: 111,170
[22] Filed: Jun. 10, 1980
[51] Int. Cl.³ .......................................... B65H 17/32
[52] U.S. Cl. .................................... 226/97; 226/196
[58] Field of Search .............. 226/196, 97, 7; 292/76; 360/102

[56] References Cited
U.S. PATENT DOCUMENTS

| | | | |
|---|---|---|---|
| 3,078,022 | 2/1963 | Durbeck | 226/97 |
| 3,087,664 | 4/1963 | Streeter | 226/97 |
| 3,270,933 | 9/1966 | Dekker | 226/97 |
| 3,347,437 | 10/1967 | Rush | 226/97 X |
| 3,420,424 | 1/1969 | Barbeau | 226/97 |
| 3,984,039 | 10/1976 | Hawley | 226/97 |

Primary Examiner—Edward J. McCarthy
Attorney, Agent, or Firm—Limbach, Limbach & Sutton

[57] ABSTRACT

Apparatus for guiding tape is disclosed wherein the tape is guided over a gaseous cushion at a guiding surface mounted relative to a reference surface with means urging the tape along the guiding surface against the reference surface. In one embodiment the urging means is the provision of the guiding surface and the reference surface positioned at a slight angle, in the range of from 5' to 30' and preferably 10' from normal so that the surfaces are positioned at an acute angle. The guide member can have the outside surface of an inverted frustum of a cone. In addition the guide member may include at least one sidewall of a vacuum column. Instead of the provision of a slight angle to urge the tape against the reference surface the apparatus can be constructed to provide a gaseous cushion between the guiding surface and the tape thicker at a location remote from the reference surface than adjacent to the reference surface. Means are provided for controlling the temperature of the gaseous stream to control the temperature of the tape. The guide member can comprise a pair of spaced apart cassette face members for guiding the tape loop pulled from a cassette to a tape head.

14 Claims, 14 Drawing Figures

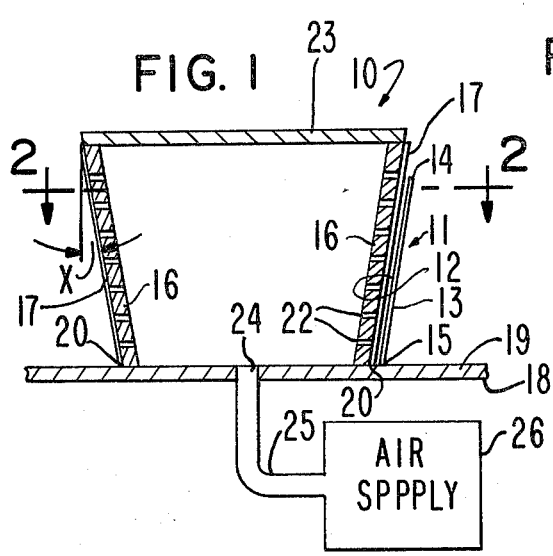
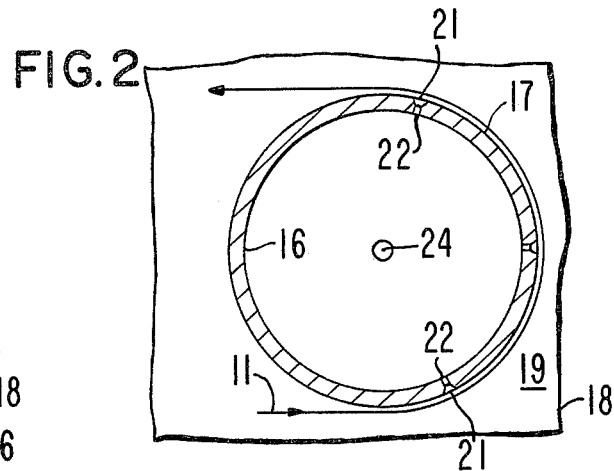
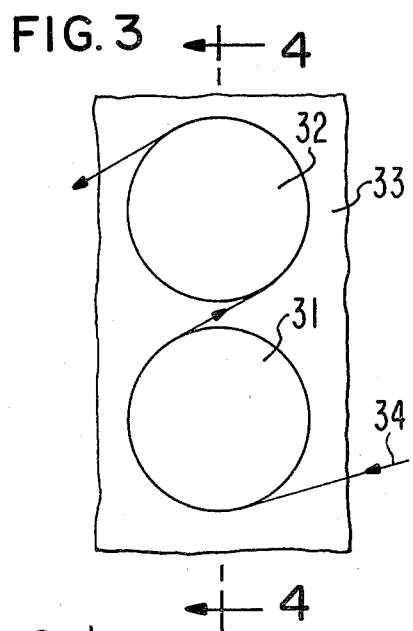
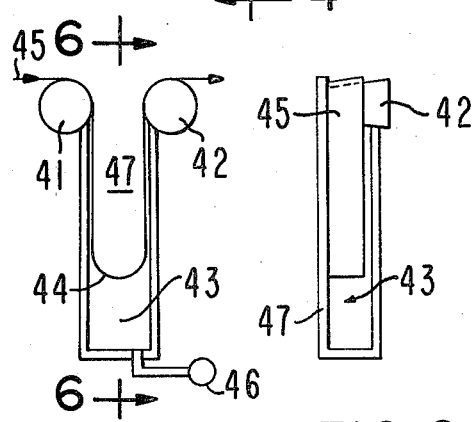
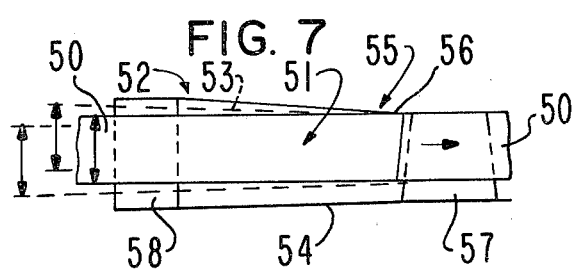

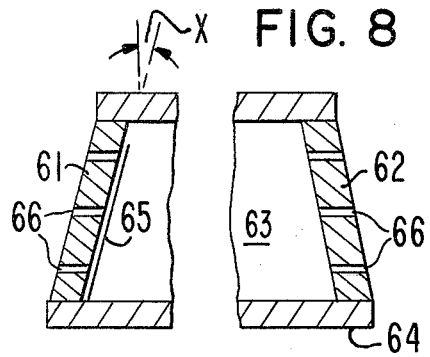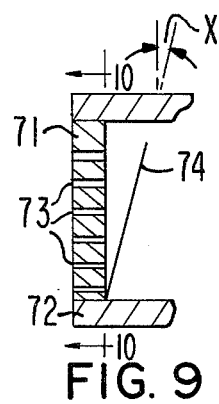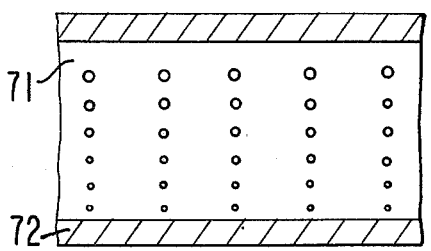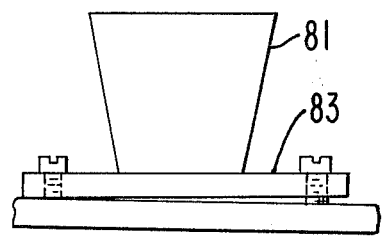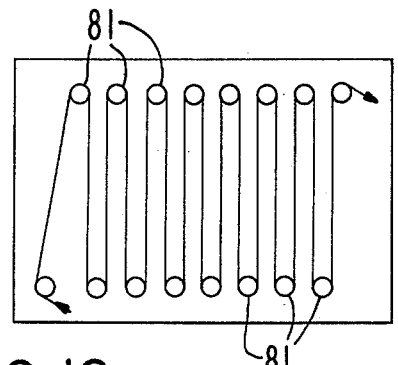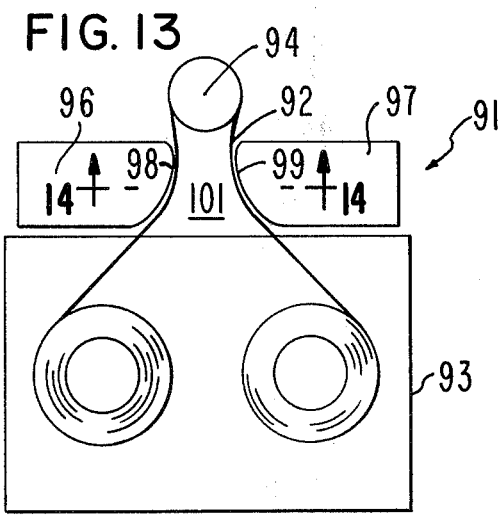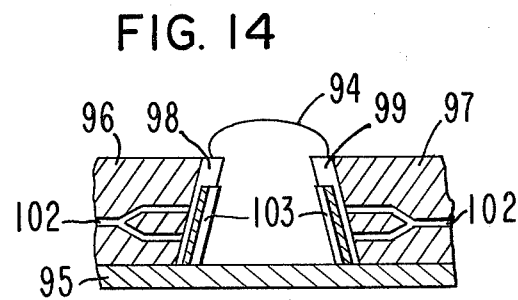

APPARATUS FOR GUIDING TAPE

The present invention relates in general to tape guiding apparatus more particularly to apparatus for accurately guiding tape to a station where precise lateral positioning of the tape is important.

The apparatus of this invention is useful for guiding thin, elongate, wide, flexible tapes of materials such as plastic, and principally plastic coated with magnetic materials for recording paper, and metal. Situations exist where it is extremely important for precise lateral positioning of the tape and to avoid difficulties with the variation in the tape edge along the length of the tape with reference to a straight line. A typical situation is a slitting operation for slitting a wide tape into a plurality of narrower tape strips. Another situation is the precise location of the tape relative to the tape head for recording or reading information to or from the tape when the information is located in different tracks across the width of the tape.

BRIEF SUMMARY OF THE INVENTION

Broadly stated, the present invention, to be described in greater detail below, is directed to apparatus for guiding a tape including a reference member having a reference surface against which the edge of the tape will be aligned and a guiding member having a guiding surface with which the broad side of the tape will be substantially aligned and with the members mounted relative to one another so that the guiding and reference surfaces intersect. Means are provided for moving the tape in the direction of the line of intersection of the surfaces. Also means are provided for directing a gaseous stream to the guiding surface to provide a gaseous cushion between that surface and the tape and means for urging the tape along the guiding against the reference surface so that the tape is always precisely located relative to the reference surface.

In accordance with one preferred embodiment of the present invention the guiding surface and the reference surface are positioned at a slight angle to normal relative to one another so that the surfaces are positioned at an acute angle. The slight angle is in the range of from 5 minutes (5') to 30 minutes (30') and preferably 10 minutes (10').

It has been discovered that this slight angle in conjunction with the lubricating gaseous surface which is stypically air guides the tape with one edge thereof in contact with the reference surface for precise steering of the tape.

In one preferred embodiment of the present invention the guiding surface can include at least one side surface of an inverted frustum of a cone. Also the invention is embodied in a guiding surface in the form of a pair of frustums positioned with their axes parallel and including means for moving the tape clockwise around one frustum and counter-clockwise around the other frustum.

In accordance with another embodiment of the present invention the guiding surface includes the side surface of at least one such frustum of a cone as described hereabove positioned at the tape outlet and of a vacuum column. In accordance with a particular feature of this embodiment of the present invention the side surface of the vacuum column includes apertures therethrough for providing a gaseous cushion between the tape and the sidewall which will also aid in urging the tape against an adjacent endwall of the vacuum column.

In accordance with still another embodiment of the present invention the guiding surface and reference surface are normal to each other and the guiding means includes means for producing a gaseous cushion between the guiding surface and the tape thicker in the region remote from the reference surface than in the region adjacent to the reference surface. In accordance with one aspect of the invention the thicker gaseous cushion is provided by having the cross-sectional area of the holes per unit area of guiding surface greater in the region remote from the reference surface than in the region adjacent to the reference.

In accordance with still another aspect of the present invention means are provided for controlling the temperature of the gaseous stream relative to the temperature of the tape for controlling the temperatue of the tape as it moves across the guiding surface. In this way either hot tape can be cooled or cool tape can be heated as desired in a system where operations are performed on the tape.

In accordance with still another aspect of the present invention a plurality of guiding members, each with an associate reference member, are mounted together along the direction of tape travel, and means are provided for adjusting the position of at least certain of the guiding members for steering the tape along the direction of travel. In accordance with still another aspect of the present invention the guiding member includes a pair of spaced apart cassette face members each having a curved guiding surface providing a narrowing opening therebetween for guiding the tape loop pulled from a cassette at the wide end of the opening to a tape head positioned beyond the narrowest portion of the opening. In accordance with this aspect of the present invention accurate recording and playback can be performed on tape contained with a cassette not constructed with precise tolerances by pulling a tape loop from the cassette for guidance and steering by the guiding member to a tape head.

In accordance with another aspect of the present invention the guiding surface is positioned adjacent one side of the opening into a vacuum column, and a second guiding surface normal to the reference surface is positioned adjacent the other side of the vacuum column opening. The other side of the column opening is wide enough to allow the tape to wander freely laterally as the tape is pulled over the second guiding surface. This allows the tape guiding apparatus to be inserted into a system where excessive wander which could be tolerated for certain prior operations must be removed.

These and other aspects, features, and advantages of the present invention will become more apparent upon a perusal of the following specification taken in conjunction with the accompanying drawings.

DESCRIPTION OF THE DRAWINGS

FIG. 1 is a schematic elevational sectional view illustrating one aspect of the present invention.

FIG. 2 is a cross-sectional view of a portion of the structure shown in FIG. 1 taken along the line 2—2 in the direction of the arrows.

FIG. 3 is a plan view of another embodiment of the present invention.

FIG. 4 is a sectional view of a portion of the structure shown in FIG. 3 taken along line 4—4 in the direction of the arrows.

FIG. 5 is a schematic elevational sectional view illustrating another embodiment of the present invention.

FIG. 6 is a cross-sectional view of a portion of the structure shown in FIG. 5 taken along line 6—6 in the direction of the arrows.

FIG. 7 is a schematic plan view of another embodiment of the present invention.

FIG. 8 is a schematic elevational sectional view of another embodiment of the present invention.

FIG. 9 is a schematic elevational sectional view of still another embodiment of the present invention.

FIG. 10 is a sectional view of a portion of the structure shown in FIG. 9 taken along line 10—10 in the direction of the arrows.

FIGS. 11 and 12 are schematic elevational and plan views illustrating another embodiment of the present invention.

FIG. 13 is a schematic plan view of another embodiment of the present invention.

FIG. 14 is an elevational sectional view of the portion of the structure shown in FIG. 13 taken along line 14—14 in the direction of the arrows.

DESCRIPTION OF THE PREFERRED EMBODIMENTS

While the present invention is applicable to apparatus for guiding numerous different types of tape, it is ideally applicable to apparatus for guiding magnetic tape for a number of different operations on such tape. While the invention will thus be described with reference to magnetic tape, the term tape is used herein and in the appended claims to mean any thin, elongate, wide flexible member of a material such as paper, metal, or plastic, typically plastic materials coated with magnetic materials.

Referring now to the drawing, with particular reference to FIGS. 1 and 2, there is schematically illustrated one embodiment of the tape guiding apparatus, and it will be appreciated that the dimensions and relations between the parts are greatly exaggerated in order to illustrate the features of the invention. As shown there tape guiding apparatus 10 is provided for guiding a thin, elongate, wide flexible tape 11 having two broad side surfaces 12 and 13 and end edges 14 and 15. The guiding apparatus includes an inverted, hollow, frustoconical, guiding member 16 having an exterior guiding surface 17. The guiding member 16 is mounted on a planar reference member 18 having an upper reference surface 19. The guiding surface 17 and reference surface 19 have a line of intersection 20 which defines the direction of movement of the tape 11.

For providing a gaseous cushion or air lubrication between the tape 11 and the guiding surface 17, the guiding member is provided with a plurality of longitudinal grooves 21 at several locations on its surface oriented transversesally to the direction of travel of the tape, and ports or orifaces 22 extend through the guiding member 16 providing communication from the inside of the guiding member 16 and various locations along the length of each groove 21. A cover 23 closes the top of the guiding member 16, and an opening 24 is provided in the reference member for directing a gaseous stream, such as air, through a line 25 from an air supply 26. Air will thus pass into the guiding member, through the ports 22 to the grooves 21 and provide an air cushion or air lubrication between the tape 11 and guiding surface 17.

The guiding surface 17 and reference surface 19 are positioned at a slight angle X to normal relative to one another so that these surfaces are positioned at an acute angle slightly less than normal to one another. It has been discovered that selection of an angle in the range of between 5 minutes (5') and 30 minutes (30') and preferably substantially 10 minutes (10') provides the appropriate angle whereby tape riding on an air cushion over the tape guiding surface 17 will be urged downwardly so that its lower edge 15 engages the reference surface 19. In this manner the tape leaving the guiding apparatus 10 is accurately positioned transversely for operations to be performed on the tape at a succeeding station.

It will be appreciated that the drawings are greatly exaggerated to bring out the existence of the angle X which is only a fraction of a degree. Additionally, while the guiding and reference members 16 and 18 have been illustrated as separate elements, they could be made as one unitary member.

It will be appreciated that the longer the length of the tape that is controlled by the guiding apparatus, the greater accuracy in steering the edge of the tape at a position spaced from the guiding apparatus. In the embodiment of FIGS. 1 and 2 the tape is guided over the length of the tape that is wrapped around the guiding member 16. The larger the diameter of the guiding member, the greater the length of tape that is edge guided.

Referring to the embodiment of FIGS. 3 and 4 there is illustrated the use of a pair of guiding members 31 and 32 supported on a reference member 33 for guiding the tape 34. The guiding members 31 and 32 are arranged so that the tape 34 is moved clockwise around one guiding member 31 and counterclockwise around the other guiding member 32.

Referring now to FIGS. 5 and 6, there is illustrated another embodiment of the present invention wherein a vacuum column is used as part of the guiding apparatus. As illustrated there a pair of inverted frustoconical guiding members 41 and 42 with air lubricated surfaces are positioned respectively at the inlet and outlet sides of a vacuum column 43 into which a loop 44 of the tape 45 is pulled by a controlled vacuum system 46. The sidewalls of the vacuum column 43 and the guide members 41 and 42 are all mounted on a reference member 47. The guiding surfaces of the guiding members 41 and 42 are positioned at the critical slight angle to normal relative to the reference member 47 such that movement of the tape 45 over the air lubricated guide surfaces of the guide members 41 and 42 will urge the edge of the tape into contact with the reference member 47.

Most tape strips have at least a certain degree of wander of their edges from a true straight line and the embodiment of FIG. 7 includes structure which allows the tape 50 to wander at the inlet. As illustrated in FIG. 7 which is a view looking into a vacuum column somewhat similar to that shown in FIGS. 5 and 6. The vacuum column 51 is wider at the inlet side 52 thereof by further spacing of its sidewalls 53 and 54 than at the right hand outlet side 55 where the sidewalls 53 and 54 are more closely spaced and include a reference surface 56 on sidewall 53 on which the inverted frustoconical guide member 57 with an air lubricated guiding surface is positioned. At the inlet side 52 of the vacuum column 51 an air lubricated guide member 58 is provided, but this guide member 58 is normal to the direction of travel of the tape leaving the guiding assembly such that the tape is free to wander at the guide surface 58 rather than being urged to one side of the air column 51. In this embodiment the tape is stably guided at the output leaving the guide member 57 but is allowed to wander over the guide member 58 and in the air column.

In accordance with another embodiment of the present invention the tape edge can be more accurately guided along the reference surface of the air column, such as the reference surface 47 in the embodiment of FIGS. 5 and 6 by providing the same slight angle relative to normal for the sidewalls of the column and preferably along with air lubrication along those sidewalls. This embodiment is illustrated in FIG. 8 wherein the outside edges of the sidewalls 61 and 62 of the air column 63 away from the bottom reference surface 64 are closer together than their bases so that the sidewalls are angled at the same slight angle of substantially 10 minutes from normal and air lubrication is provided between the sidewalls 61 and 62 and the tape 65 by holes 66 in the sidewalls. Air is drawn in through these holes by the vacuum apparatus providing the appropriate air lubrication.

In accordance with another embodiment of the invention that is illustrated in FIGS. 9 and 10, the force urging the tape against the reference surface can be established by a air cushion thicker at the part of the tape removed from the reference surface than part of the tape adjacent to the reference surface. As illustrated there the air column sidewall 71 which is mounted normal to the air column bottom reference surface 72 is provided with air holes 73 along its width with the diameter of the holes increasing in the direction away from the bottom reference member 72. When air is drawn through the holes 73 the tape 74 will assume a position at the slight angle X relative to the surface of the sidewall 71 so that the lower edge of the tape is urged into contact with the reference surface 72. By way of example in a tape guiding apparatus including an air column for guiding a 6 inch tape to a tape slitter lines of holes formed with different drill sizes from member 54 up to 69 respectively from locations remote from the reference surface to locations adjacent to the reference surface will effectively urge the edge of the tape into contact with the reference surface. Instead of different hole sizes, a greater number of holes could be used remote from the reference surface so that the cross-sectional area of the holes per unit area of the guiding surface are greater remote from the reference surface than adjacent to the reference surface.

It will be appreciated that the air lubricated guiding apparatus in accordance with this invention can be utilized in numerous different structures. FIGS. 11 and 12 illustrate how a plurality of inverted frustoconical guiding members 81 having base reference surfaces 83 can be mounted together along the direction of tape travel in a serpentine tape housing and each of the guiding members can have its base reference tilted with respect to the bottom surface of the housing to steer the tape in desired manner.

Another embodiment of the present invention is illustrated in FIGS. 13 and 14 where the tape guiding apparatus is provided for accurate steering of a loop of tape pulled out from a tape cassette which typically is not constructed with the appropriate close tolerances for providing accurate tape guidance. As illustrated there a tape operational unit 91 is provided for pulling a tape loop 92 out from a conventional tape cassette 93 for operation on the tape such as with a recording head 94. The head is mounted on a base reference member 95 on which is also mounted a pair of spaced apart cassette face guiding members 96 and 97 each having a curved guiding surface 98 and 99 respectively. The surfaces 98 and 99 in plan view as shown in FIG. 13 provide an opening 101 therebetween for guiding the tape loop 92 pulled from the cassette 93 at the wide end of the opening to the tape head 94 positioned beyond the narrowest portion of the opening. The guiding surfaces 98 and 99 are positioned at the slight angle relative to normal to the reference member 95 and are also provided with orifaces 102 to produce an air cushion between the guiding surfaces 98 and 99 and the tape 103. The slightly angled surface from normal and the air cushion in conjunction with the curved guiding surfaces 98 and 99 indexes the tape 103 against the base reference member 95 which provides the precision alignment of the tape on the head 94.

It will be appreciated that numerous modifications and variations can be made to the structures of the preferred embodiments as described within the scope of the present invention as defined by the appended claims.

I claim:

1. Apparatus for guiding a tape comprising, in combination:
   a reference member having a reference surface against which the edge of the tape will be aligned,
   a guiding member having a guiding surface with which the broad side of the tape will be substantially aligned,
   means for mounting said guiding member and said reference member so that said guiding surface and said reference surface intersect,
   means for moving the tape in the direction of the line of intersection of said guiding surface and said reference surface,
   means for directing a gaseous stream to said guiding surface to provide a gaseous cushion between said surface and the tape, and
   means for urging the tape along said guiding surface against said reference surface to steer the tape.

2. Apparatus for guiding a tape comprising, in combination:
   a reference member having a reference surface against which the edge of the tape will be aligned,
   a guiding member having a guiding surface with which the broad side of the tape will be substantially aligned,
   means for mounting said guiding member and said reference member so that said guiding surface and said reference surface intersect,
   means for moving the tape in the direction of the line of intersection of said guiding surface and said reference surface,
   means for directing a gaseous stream to said guiding surface to provide a gaseous cushion between said surface and the tape, and
   means for urging the tape along said guiding surface against said reference surface to steer the tape,
   said urging means including said guiding surface and said reference surface positioned at a slight angle to normal relative to one another so that said surfaces are positioned at an acute angle.

3. The apparatus of claim 2 wherein said slight angle is in the range of 5' to 30'.

4. The apparatus of claim 2 wherein said slight angle is substantially 10'.

5. Apparatus for guiding a tape comprising, in combination:
   a reference member having a reference surface against which the edge of the tape will be aligned,
   a guiding member having a guiding surface with which the broad side of the tape will be substantially aligned,
   means for mounting said guiding member and said reference member so that said guiding surface and said reference surface intersect,
   means for moving the tape in the direction of the line of intersection of said guiding surface and said reference surface,
   means for directing a gaseous stream to said guiding surface to provide a gaseous cushion between said surface and the tape, and
   means for urging the tape along said guiding surface against said reference surface to steer the tape,
   said guiding surface having at least the side surface of an inverted frustrum of a cone having a vertex angle in the range of 5' to 30'.

6. The apparatus of claim 5 wherein said vertex angle is substantially 10'.

7. Apparatus for guiding a tape comprising, in combination:
   a reference member having a reference surface against which the edge of the tape will be aligned,
   a guiding member having a guiding surface with which the broad side of the tape will be substantially aligned,
   means for mounting said guiding member and said reference member so that said guiding surface and said reference surface intersect,
   means for moving the tape in the direction of the line of intersection of said guiding surface and said reference surface,
   means for directing a gaseous stream to said guiding surface to provide a gaseous cushion between said surface and the tape, and
   means for urging the tape along said guiding surface against said reference surface to steer the tape,
   said guiding surface having at least the side surface of a pair of frustrums of cones each having a vertex angle in the range of 5' to 30', said pair of frustrums positioned with their axes parallel and means for moving the tape clockwise around one frustrum and counterclockwise around the other frustrum.

8. Apparatus for guiding a tape comprising, in combination:
   a reference member having a reference surface against which the edge of the tape will be aligned,
   a guiding member having a guiding surface with which the broad side of the tape will be substantially aligned,
   means for mounting said guiding member and said reference member so that said guiding surface and said reference surface intersect,
   means for moving the tape in the direction of the line of intersection of said guiding surface and said reference surface,
   means for directing a gaseous stream to said guiding surface to provide a gaseous cushion between said surface and the tape, and
   means for urging the tape along said guiding surface against said reference surface to steer the tape,
   said guiding surface including at least one side wall of a vacuum column and the side surface of a frustrum of a cone positioned adjacent the tape exit from the vacuum chamber.

9. The apparatus of claims 8 wherein said guiding surface and said reference surface are normal to each other and said guiding means includes means for producing a thicker gaseous cushion between said guiding surface and said tape remote from said reference surface than adjacent said reference surface.

10. The apparatus of claim 9 wherein said guiding surface has a matrix of holes for passing the gaseous stream through said guiding member to said guiding surface, the cross sectional area of said holes per unit area of said guiding surface being greater remote from said reference surface than adjacent said reference surface.

11. The apparatus of claims 2, 7, 8 or 9 including means for controlling the temperature of said gaseous stream to control the temperature of the tape.

12. Apparatus for guiding a tape comprising, in combination:
   a reference member having a reference surface against which the edge of the tape will be aligned,
   a guiding member having a guiding surface with which the broad side of the tape will be substantially aligned,
   means for mounting said guiding member and said reference member so that said guiding surface and said reference surface intersect,
   means for moving the tape in the direction of the line of intersection of said guiding surface and said reference surface,
   means for directing a gaseous stream to said guiding surface to provide a gaseous cushion between said surface and the tape, and
   means for urging the tape along said guiding surface against said reference surface to steer the tape,
   a plurality of guiding members each with an associated reference member mounted together along the direction of tape travel and means for adjusting the position of at least certain of said guiding members to steer the tape.

13. The apparatus of claims 2, 3 or 4 wherein said guiding member includes a pair of spaced apart cassette face members each have a curved guiding surface providing a narrowing opening therebetween for guiding the tape loop pulled from a cassette at the wide end of the opening to a tape head positioned beyond the narrowest portion of the opening.

14. The apparatus of claims 2, 3 or 4 including a vacuum column positioned with one side of the opening therein adjacent said guiding surface, a second guiding surface adjacent the other side of the opening into said vacuum column, said second guiding surface positioned normal to said reference surface, said other side of the opening being wide enough to allow the tape to wander laterally as the tape is pulled over said second guiding surface into said vacuum column.

* * * * *